(12) United States Patent
Okino et al.

(10) Patent No.: US 11,273,371 B2
(45) Date of Patent: Mar. 15, 2022

(54) GAME MACHINE FOR DEVELOPMENT, AND PROGRAM EXECUTION METHOD

(71) Applicant: Sony Interactive Entertainment Inc., Tokyo (JP)

(72) Inventors: Naoto Okino, Tokyo (JP); Seiji Murata, Chiba (JP); Kenichi Matsuura, Chiba (JP); Minjie Zhu, Tokyo (JP); Masaki Osawa, Bristol (GB); Peter Marshall, Bristol (GB); Matthew Bush, Dublin (IE)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/895,274

(22) Filed: Jun. 8, 2020

(65) Prior Publication Data
US 2020/0391107 A1 Dec. 17, 2020

(30) Foreign Application Priority Data
Jun. 17, 2019 (JP) .............................. JP2019-111835

(51) Int. Cl.
*G06F 9/44* (2018.01)
*A63F 13/30* (2014.01)
*A63F 13/95* (2014.01)
*G06F 8/70* (2018.01)

(52) U.S. Cl.
CPC .............. *A63F 13/30* (2014.09); *A63F 13/95* (2014.09); *G06F 8/70* (2013.01)

(58) Field of Classification Search
None
See application file for complete search history.

(56) References Cited

U.S. PATENT DOCUMENTS

| 5,732,275 A * | 3/1998 | Kullick | G06F 8/65 717/170 |
| 6,523,166 B1 * | 2/2003 | Mishra | G06F 8/61 707/999.104 |

(Continued)

FOREIGN PATENT DOCUMENTS

| JP | 2000357117 A | 12/2000 |
| JP | 2008167834 A | 7/2008 |

(Continued)

OTHER PUBLICATIONS

Notice of Reasons for Refusal for corresponding JP Application No. 2019-111835, 5 pages, dated May 14, 2021.

(Continued)

*Primary Examiner* — Sunit Pandya
(74) *Attorney, Agent, or Firm* — Matthew B. Dernier, Esq.

(57) ABSTRACT

A game machine for development is connected to a host computer, reads out a file requested by a game program under development from a storage device, and executes the game program. In the game machine for development, a file confirmation section confirms whether or not the file requested by the game program is stored in the storage device, a file request section requests the host computer to transmit the file in a case where the file is not stored, and a storage processor acquires the file from the host computer and stores the file in the storage device.

8 Claims, 8 Drawing Sheets

(56) References Cited

U.S. PATENT DOCUMENTS

| | | | |
|---|---|---|---|
| 7,987,459 B2* | 7/2011 | Chow | G06F 9/44536 |
| | | | 717/168 |
| 9,430,217 B2 | 8/2016 | Chen | |
| 10,713,028 B2* | 7/2020 | Wiswall | G06F 8/61 |
| 2012/0047239 A1* | 2/2012 | Donahue | G06F 9/5072 |
| | | | 709/220 |
| 2012/0278439 A1 | 11/2012 | Yavuz | |
| 2013/0311986 A1 | 11/2013 | Yan | |
| 2015/0220320 A1 | 8/2015 | Chen | |

FOREIGN PATENT DOCUMENTS

| | | |
|---|---|---|
| JP | 2015527676 A | 9/2015 |
| JP | 2016020034 A | 2/2016 |
| JP | 2018148300 A | 9/2018 |

OTHER PUBLICATIONS

Extended European Search Report for corresponding EP Application No. 20174516.3, 7 pages, dated Oct. 28, 2020.
Notice of Reasons for Refusal for corresponding JP Application No. 2019-111835, 7 pages, dated Nov. 5, 2021.

* cited by examiner

HOST COMPUTER 2

GAME MACHINE FOR DEVELOPMENT, AND PROGRAM EXECUTION METHOD

CROSS REFERENCE TO RELATED APPLICATIONS

This application claims the benefit of Japanese Priority Patent Application JP 2019-111835 filed Jun. 17, 2019, the entire contents of which are incorporated herein by reference.

BACKGROUND

The present disclosure relates to a technology for executing a game program under development.

Development of a game program for a console game machine is performed using a development machine having target hardware or a dedicated machine (a game machine for development) called a test machine, and a personal computer (PC). Various kinds of game development environments are available. However, in general, game files created on the PC are successively stored in a host computer, and when operation confirmation is performed, all game files stored in the host computer are copied in the game machine for development, and then the operation confirmation is performed on the game machine for development.

SUMMARY

However, when a data size of the game is extremely large, a long period of time may be required to transfer all game files to the game machine for development, and spending time and labor for the data transfer every time the operation confirmation is performed is inefficient. To avoid this inefficiency, it is sometimes performed that, while the game files are kept in the host computer, the game machine for development reads out the game files from the host computer and then the operation confirmation is performed. This method is, however, provisional in nature. Particularly, in a case where the game machine for development includes a high-speed storage, the development environment in which the game files are read out from the host computer is not suitable for the operation confirmation of rapid response.

Therefore, it is desirable to provide a technology for efficiently performing the operation confirmation.

An embodiment of the present disclosure relates to a game machine for development that is connected to a host computer, reads out a file requested by a game program under development from a storage device, and executes the game program. The game machine for development includes a file confirmation section that confirms whether or not a file requested by the game program is stored in a storage device, a file request section that requests the host computer to transmit the file in a case where the file is not stored, and a storage processor that acquires the file from the host computer and stores the file in the storage device.

Another embodiment of the present disclosure relates to a method for executing a game program under development in a game machine for development connected to a host computer. The method includes confirming whether or not a file requested by the game program is stored in a storage device, requesting the host computer to transmit the file in a case where the file is not stored, and acquiring the file from the host computer and storing the file in the storage device.

A configuration in which any combination of the components described above and expression in the present disclosure are converted among methods, devices, systems, recording media, computer programs, and others is also effective as the embodiment of the present disclosure.

According to the present disclosure, a technology that efficiently performs operation confirmation can be provided.

DETAILED DESCRIPTION OF THE PREFERRED EMBODIMENT

Figure 1:
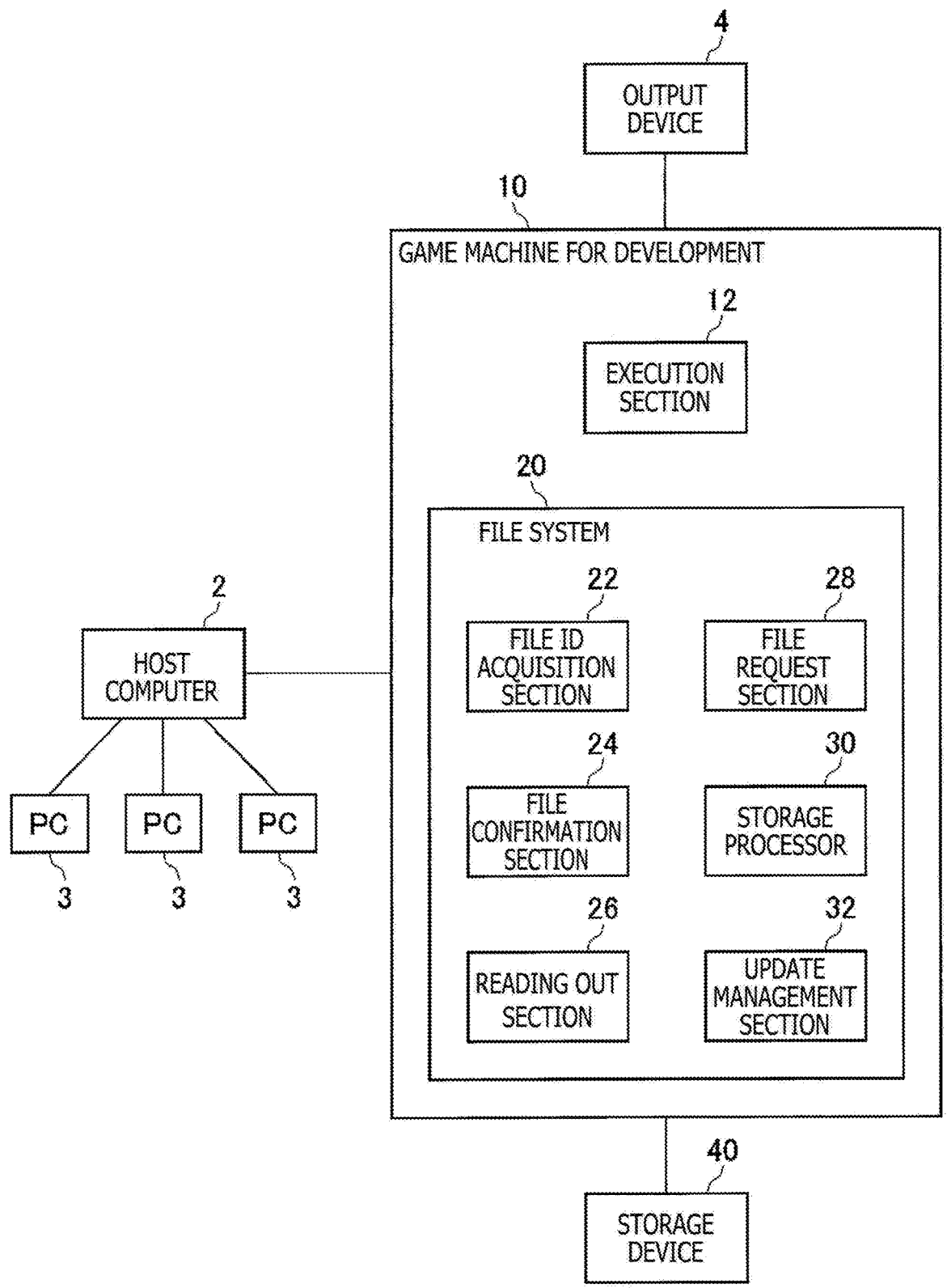
FIG. 1 is a diagram illustrating a game development system according to an exemplary embodiment of the present disclosure.

FIG. 1 illustrates a game development system 1 according to an exemplary embodiment of the present disclosure. The game development system 1 includes a host computer 2, personal computers (PCs) 3, an output device 4, a game machine for development 10, and a storage device 40. The game machine for development 10 and the PCs 3 are connected to the host computer 2. The game machine for development 10 includes target hardware of a console game machine. The storage device 40 is a built-in storage of the game machine for development 10, and may be a solid-state drive (SSD), for example. Note that in a test environment, the storage device 40 may be an external storage.

Each game developer uses the PC 3, conducts development of his/her own range in charge, and uploads a resultant game file to the host computer 2. Therefore, various game files are uploaded to the host computer 2 at any timing.

The game machine for development 10 includes an execution section 12 and a file system 20. The output device 4 such as a television is connected to the game machine for development 10. The execution section 12 reads out a necessary game file from the storage device 40, executes the game program under development, and outputs a game image and a game sound from the output device 4.

The file system 20 includes a file identification (ID) acquisition section 22, a file confirmation section 24, a reading out section 26, a file request section 28, a storage processor 30, and an update management section 32, to implement a management function of the game files. In FIG. 1, components described as functional blocks that perform various processes can be configured with circuit blocks, memories, and other large-scale integrations (LSIs) in terms of hardware, and can be configured with, for example, programs loaded in the memories in terms of software. Accordingly, persons skilled in the art easily understand that those functional blocks can be implemented with hardware alone, software alone, or a combination thereof in various forms, and are not limited to any one thereof.

In the game development system 1, when the execution section 12 executes the game program, a process for transferring all game files stored in the host computer 2 to the storage device 40 is not performed. When the game file requested by the game program is present in the storage device 40, the game machine for development 10 reads out this game file. In contrast, when the game file requested by the game program is not present in the storage device 40, this game file is acquired from the host computer 2. This procedure will be described below.

Figure 2A:
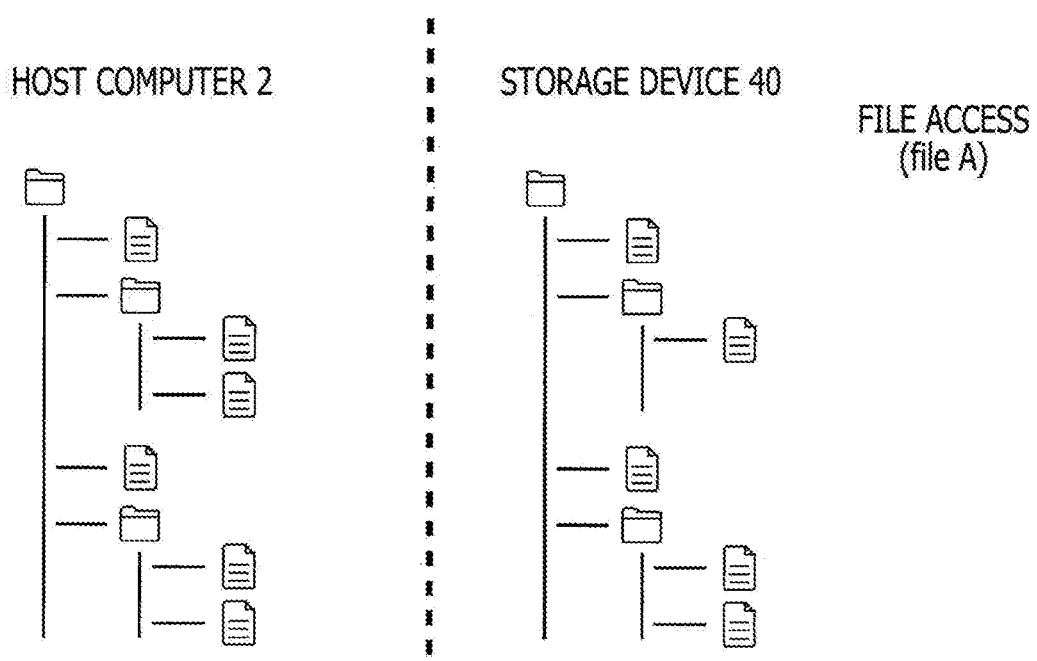
FIGS. 2A and 2B depict diagrams illustrating an example of file trees in a host computer and a storage device.

FIG. 2A illustrates an example of file trees in the host computer 2 and the storage device 40. In this example, the host computer 2 and the storage device 40 store plural files each of which is common between the host computer 2 and the storage device 40. While the execution section 12 executes the game program, when the file ID acquisition section 22 acquires identification information (file ID) for identifying the game file requested by the game program, the file confirmation section 24 confirms whether or not the file requested by the game program is stored in the storage device 40. FIG. 2A illustrates an example in which a file A is requested by the game program to be read out.

Figure 2B:
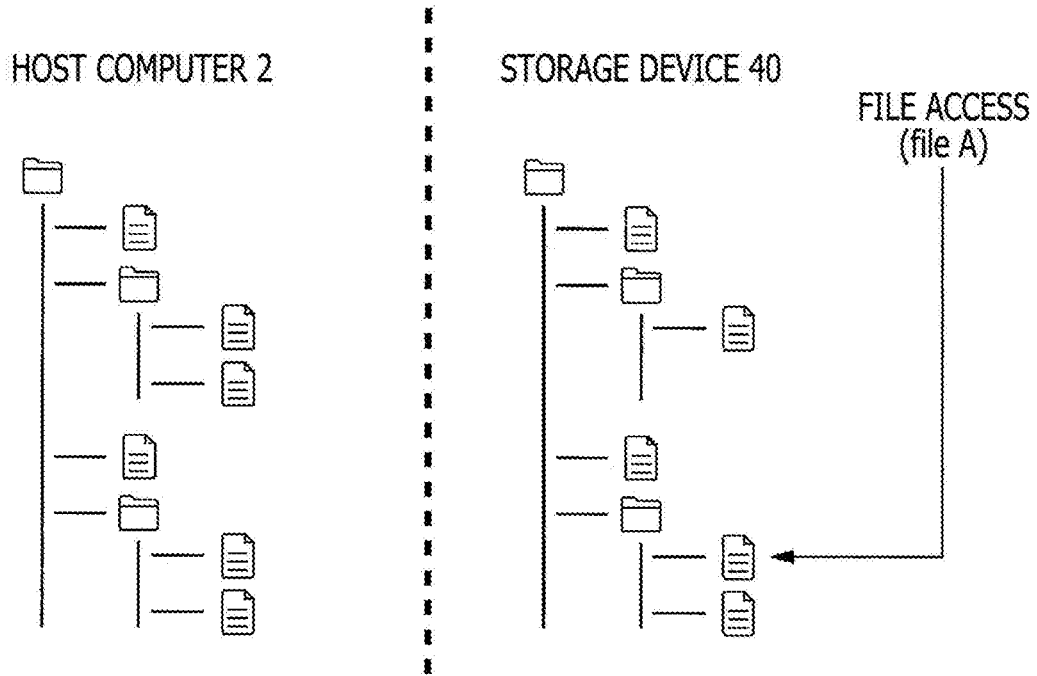

FIG. 2B illustrates a state in which the requested file is present in the storage device 40. When the file confirmation section 24 confirms that the file A is stored in the storage device 40, the reading out section 26 reads out the file A from the storage device 40 and loads the file A on a main memory. As described above, in a case where the game file requested by the game program is stored in the storage device 40, the reading section 26 can immediately read out the game file, thereby efficiently achieving the operation confirmation of the game program.

Figure 3A:
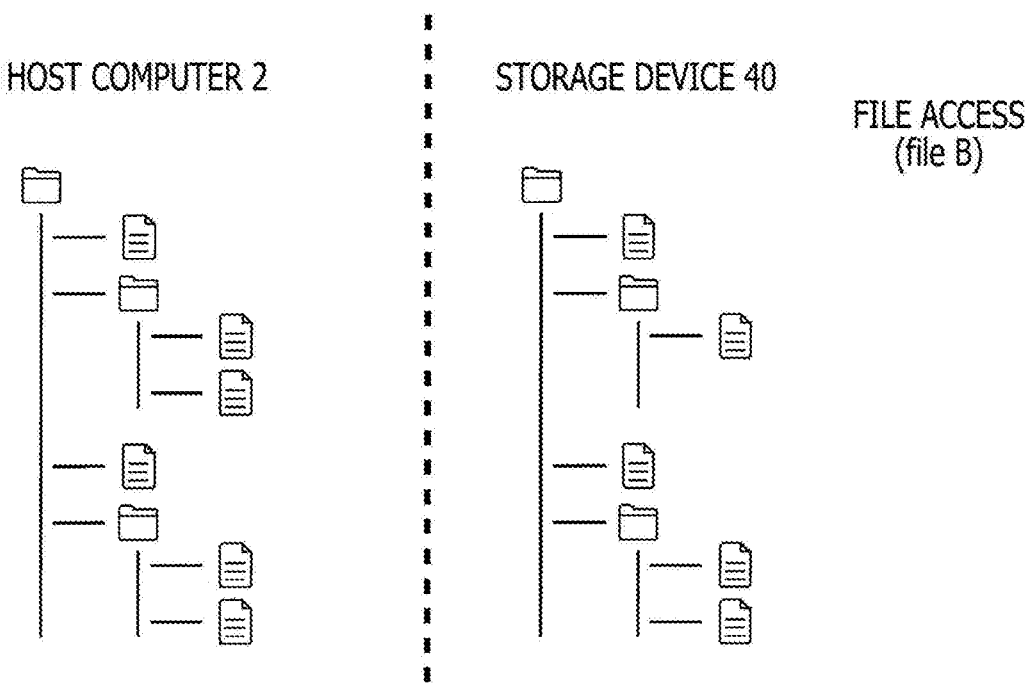
FIGS. 3A and 3B depict diagrams illustrating an example of the file trees in the host computer and the storage device.

FIG. 3A illustrates an example of the file trees in the host computer 2 and the storage 40. In this example, the storage device 40 does not store a part of files stored in the host computer 2. In the game development system 1 of the exemplary embodiment, even in a case where synchronization is not established between the file tree in the host computer 2 and the file tree in the storage device 40, the operation confirmation of the game program can efficiently be performed, which is one of features.

When the file ID acquisition section 22 acquires the file ID of the game file requested by the game program, the file confirmation section 24 confirms whether or not the file requested by the game program is stored in the storage device 40. FIG. 3A illustrates an example in which a file B is requested by the game program to be read out.

Figure 3B:
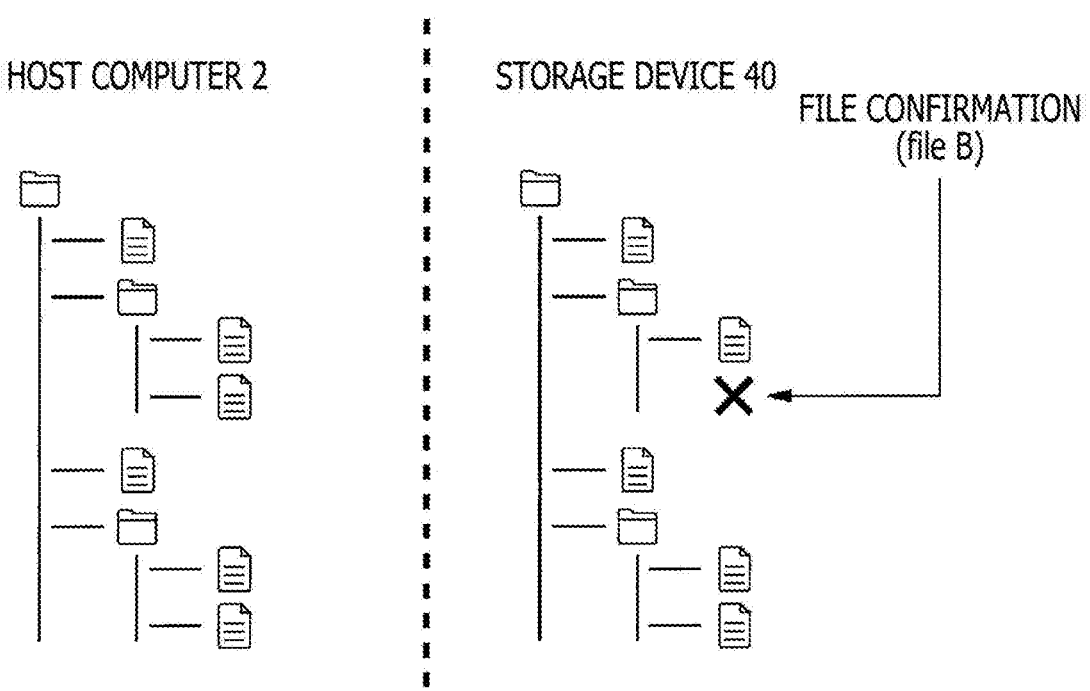
Figure 4A:
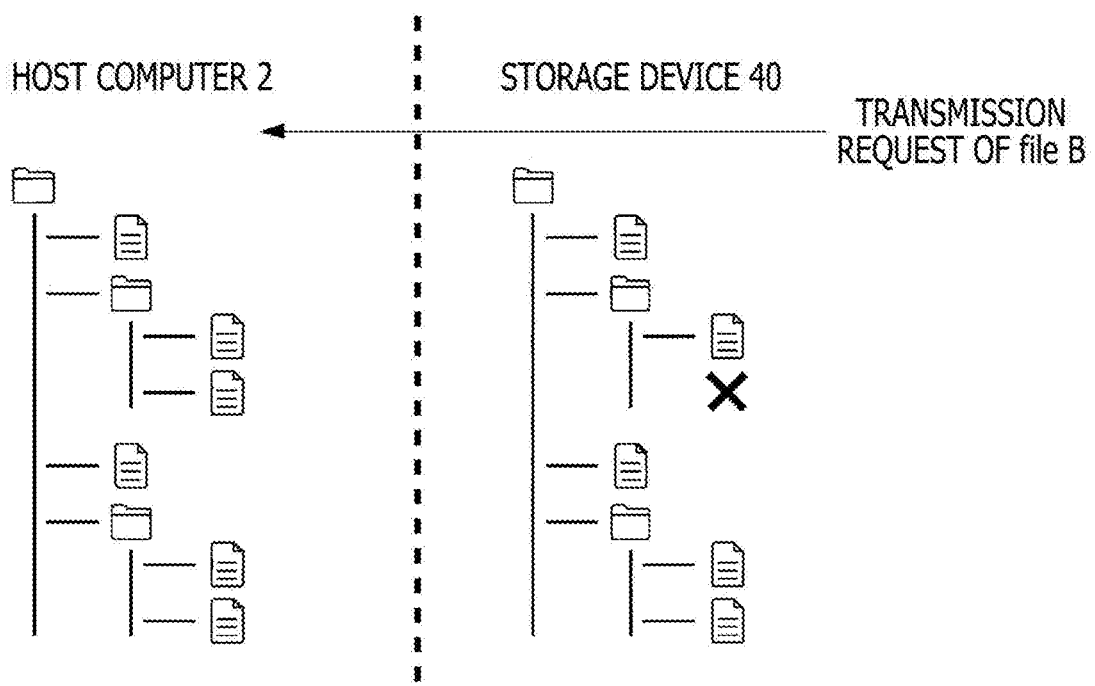
FIGS. 4A and 4B depict diagrams illustrating an example of the file trees in the host computer and the storage device.

FIG. 3B illustrates a state in which the requested file is not present in the storage device 40. When the file confirmation section 24 confirms that the file B is not stored in the storage device 40, the file request section 28 requests the host computer 2 to transmit the file B. FIG. 4A illustrates a state in which the file request section 28 transmits a transmission request of the file B to the host computer 2.

Figure 4B:
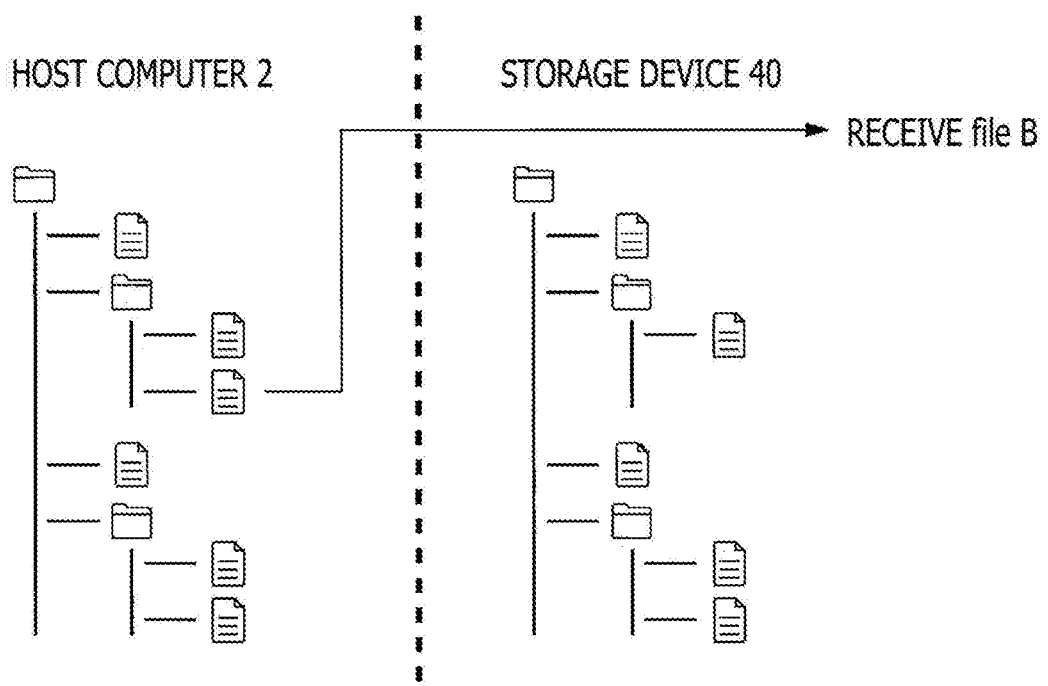

When receiving the transmission request of the file B, the host computer 2 transmits the file B to the game machine for development 10. FIG. 4B illustrates a state in which the host computer 2 transmits the file B.

Figure 5A:
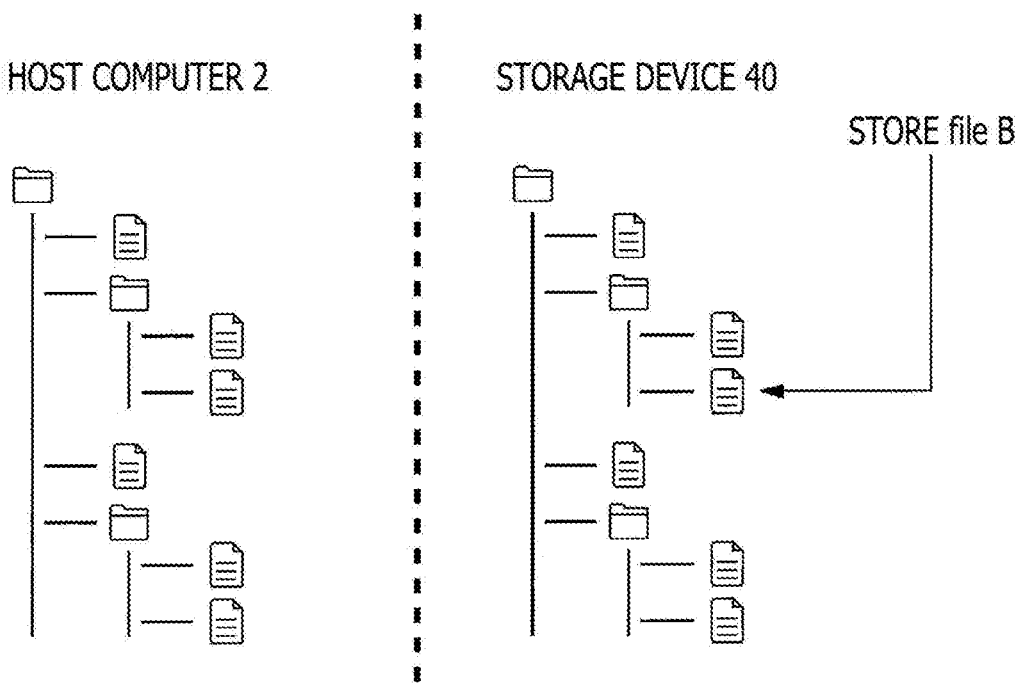
FIGS. 5A and 5B depict diagrams illustrating an example of the file trees in the host computer and the storage device.
Figure 5B:
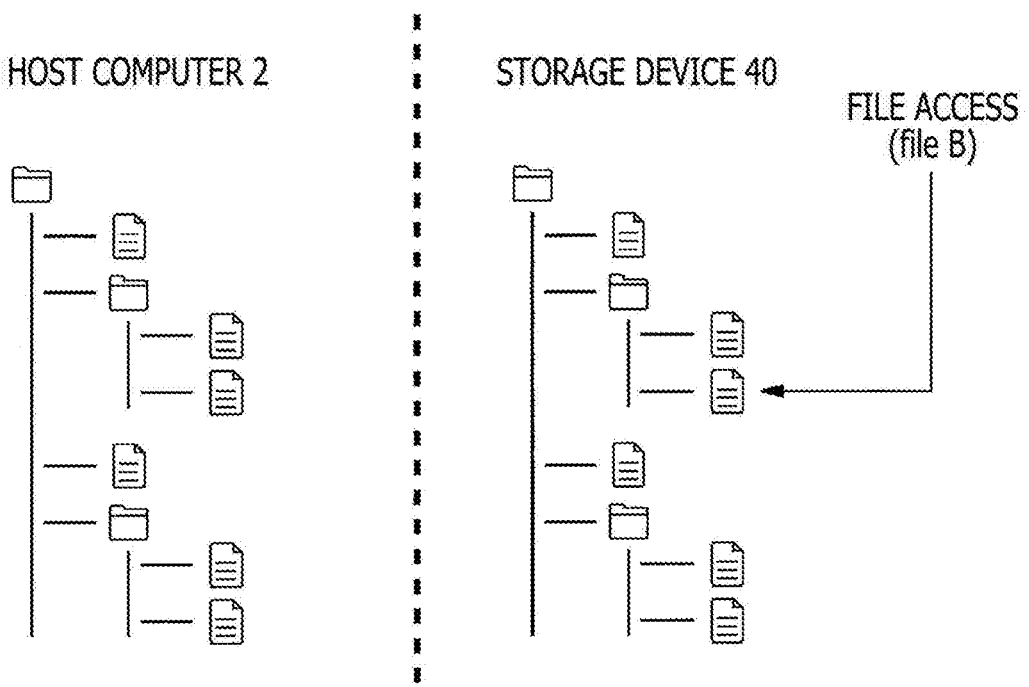

The storage processor 30 in the game machine for development 10 acquires the file B from the host computer 2 and stores the file B in the storage device 40. FIG. 5A illustrates a state in which the storage processor 30 stores the file B in the storage device 40.

FIG. 5A illustrates a state in which the reading out section 26 reads out the file B from the storage device 40 and loads the file B on the main memory. As described above, even in a case where the game file requested by the game program is not stored in the storage device 40, the file system 20 promptly acquires the necessary game file from the host computer 2, thereby efficiently achieving the operation confirmation of the game program.

While the game files in the host computer 2 are successively updated by the game developers, transferring the game file to the game machine for development 10 every time the game file is updated to establish synchronization is not efficient. In addition, this procedure is unfavorable because the number of writing times into the SSD is uselessly increased. Accordingly, the game machine for development 10 acquires the updated game file in the following procedures.

Figure 6A:
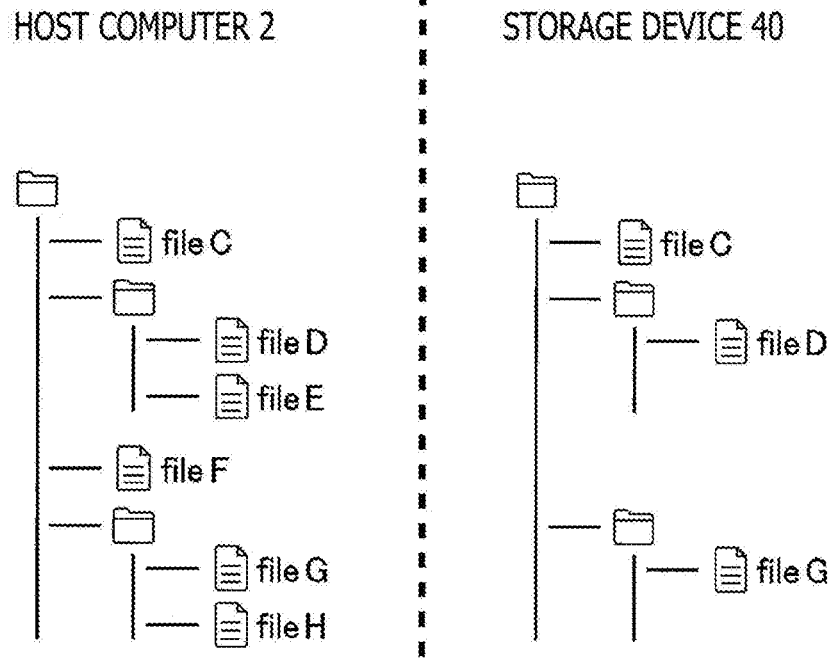
FIGS. 6A and 6B depict diagrams illustrating an example of the file trees in the host computer and the storage device.

FIG. 6A illustrates an example of the file trees in the host computer 2 and the storage device 40. In this example, the host computer 2 stores six files C, D, E, F, G, and H, and the storage device 40 stores three files C, D, and G.

Figure 6B:
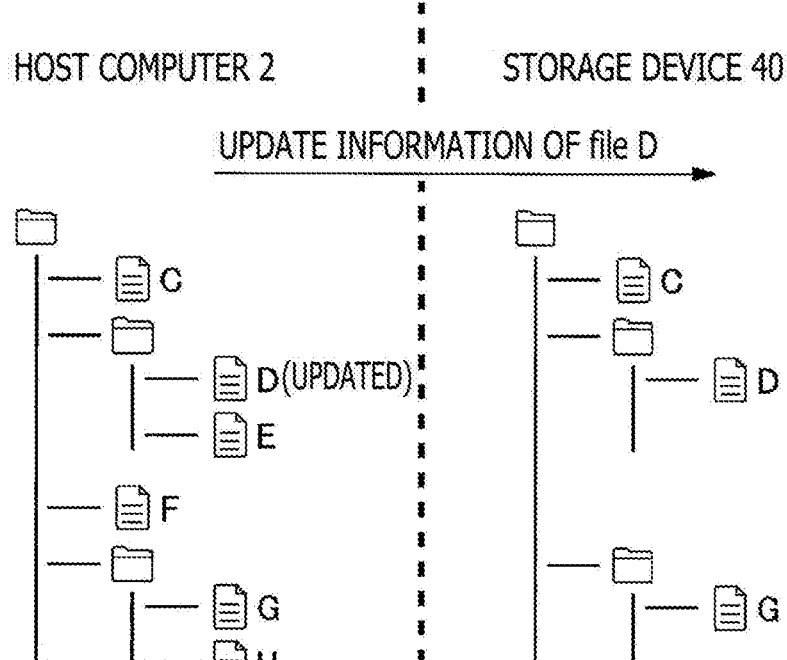

FIG. 6B illustrates a state in which the file in the host computer 2 is updated. Here, the file D is updated. The host computer 2 includes a program for monitoring states of the game files, and the monitoring program manages updating states of the game files. Note that the game files to be monitored are the game files that have been transferred to the storage device 40. Accordingly, the monitoring program manages updating states of the files C, D, and G in the host computer 2.

When detecting that the file D is updated, the monitoring program transmits update information indicating that the file D is updated to the game machine for development 10. The update management section 32 in the game machine for development 10 acquires and retains the update information indicating that the file D stored in the storage device 40 is updated in the host computer 2. With this procedure, the update management section 32 recognizes that the file D is updated and that the file D stored in the storage device 40 is of an old version.

While the game program is executed, the file ID acquisition section 22 acquires the file ID for identifying the game file requested by the game program. When confirming that the file requested by the game program is the file D and that the file D is stored in the storage device 40, the file confirmation section 24 inquires of the update management section 32 whether the update information of the file D is retained.

Figure 7A:
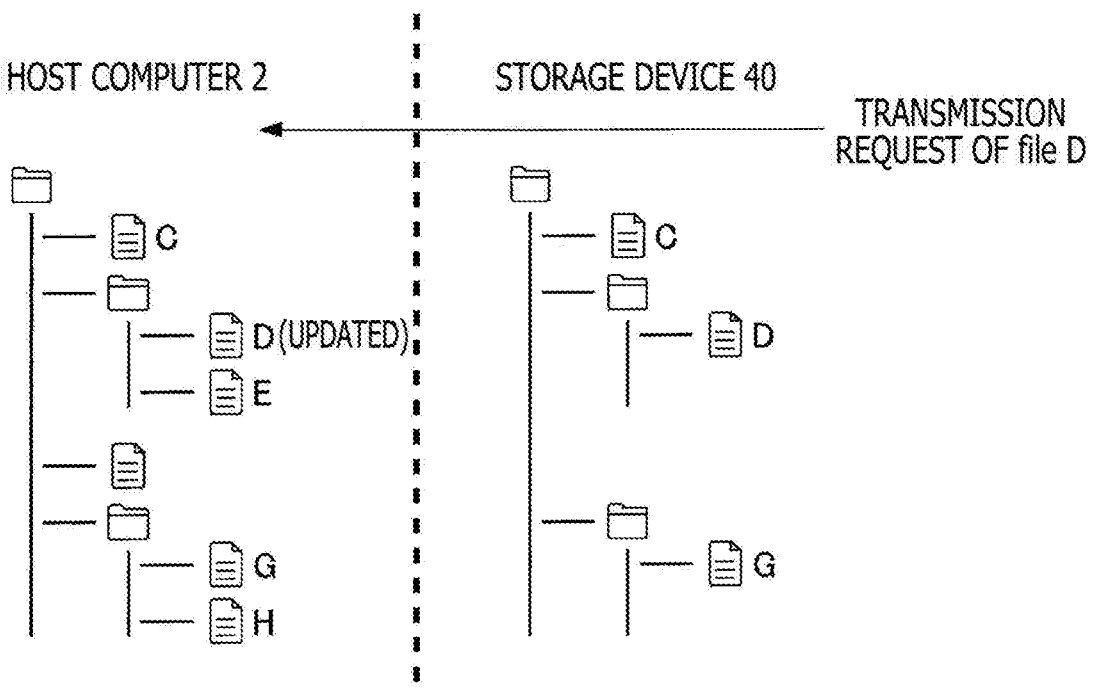
FIGS. 7A and 7B depict diagrams illustrating an example of the file trees in the host computer and the storage device.

Here, the update management section 32 retains the update information of the file D requested by the game program. The update management section 32 informs the file request section 28 of the file ID of the file D, and the file request section 28 requests the host computer 2 to transmit the file D. FIG. 7A illustrates a state in which the file request section 28 transmits a transmission request of the file D to the host computer 2.

Figure 7B:
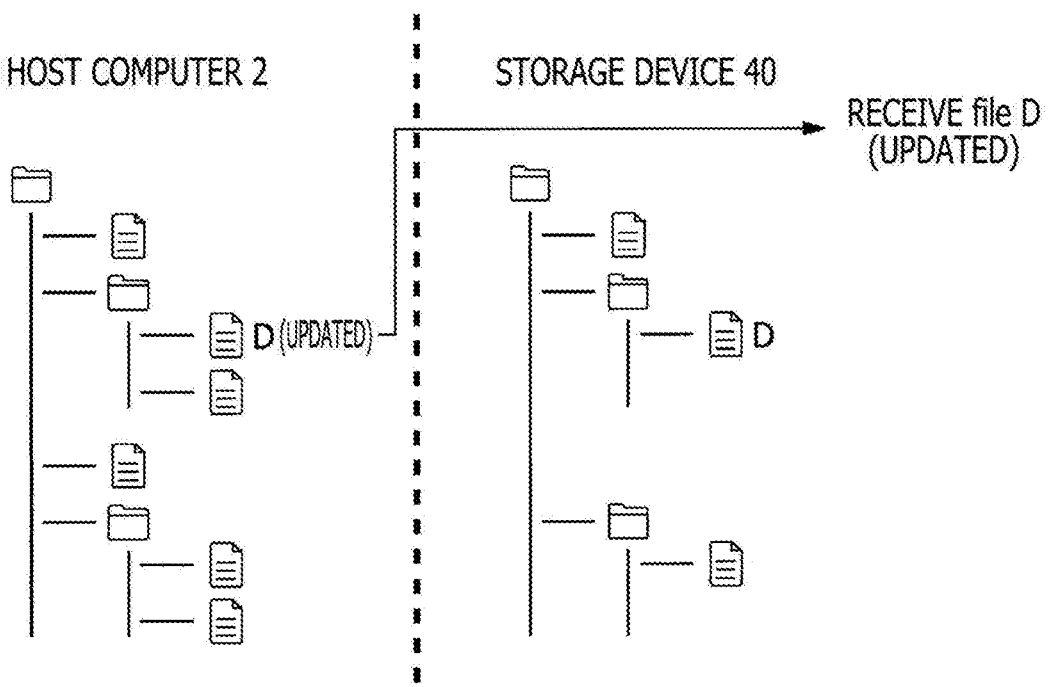

When receiving the transmission request of the file D, the host computer 2 transmits the updated file D to the game machine for development 10. FIG. 7B illustrates a state in which the host computer 2 transmits the updated file D.

Note that in the exemplary embodiment, the file request section 28 transmits the transmission request of the file D when the game program requests the file D, but the file request section 28 may transmit the transmission request of the updated file to the host computer 2 when another predetermined condition is satisfied. For example, the file request section 28 may request transmission of the file identified by the update information retained by the update management section 32 on condition that a predetermined time arrives. The predetermined time may be a time at which the game machine for development 10 is predicted not to be used or to seldom be used (e.g., two o'clock a.m.). The file request section 28 may request the host computer 2 to transmit a file that is already stored in the storage device 40 and is updated in the host computer 2.

In a case where the update management section 32 retains update information regarding a plurality of files, the file request section 28 may request transmission of the plurality of files in a collective manner. Note that during a period when the host computer 2 successively transmits the plurality of files, when the file request section 28 transmits the transmission request of the file requested by the game program to the host computer 2, the host computer 2 may preferentially transmit this file to the game machine for development 10.

While the game program is executed, the storage processor 30 stores the updated file D in the storage device 40 according to any one of plural writing rules. The writing rule is set in advance, and the storage processor 30 performs a writing process of the updated file according to the set writing rule.

In a first rule, when acquiring the updated file D, the storage processor 30 overwrites the updated file D to save it. Therefore, the original file D is deleted from the storage device 40, and the storage device 40 stores only one file D.

In a second rule, the storage processor 30 stores the updated file D in the storage device 40 together with the original file D.

Figure 8:
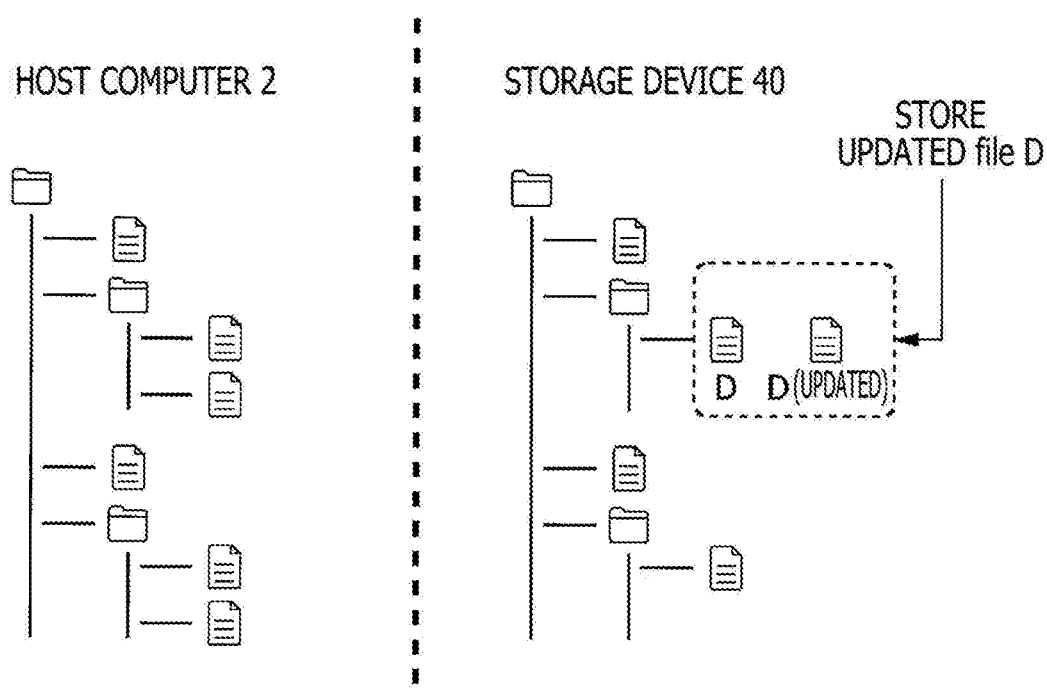
FIG. 8 is a diagram illustrating an example of the file trees in the host computer and the storage device.

FIG. 8 illustrates a state in which the storage device 40 stores two files D, which are the pre-update file D and the updated file D. The storage processor 30 stores the updated file D in the storage device 40 together with the pre-update file D. The second rule assumes that the game program includes a specification for selecting the file to be used. Here, when the game program selects the updated file D, the storage processor 30 may delete the pre-update file D from the storage device 40. Note that the storage device 40 may maintain a state in which two files D are stored, as long as the game program selects the pre-update file D.

In a third rule, similarly to the second rule, the storage processor 30 stores the updated file D in the storage device 40 together with the original file D. The game program which is executed may use the pre-update file D, but may not use the updated file D. When the game program is terminated, the storage processor 30 deletes the pre-update file D from the storage device 40. With this procedure, with respect to the file D, only the updated file D is left in the storage device 40. When the game program is activated next, the game program uses the updated file D.

As described above, the present disclosure has been described based on the exemplary embodiment. Persons skilled in the art understand that the exemplary embodiment is merely illustrative, various modifications are possible in combinations of the components or the processing processes, and such modifications also fall within a range of the present disclosure.

Figure 9:
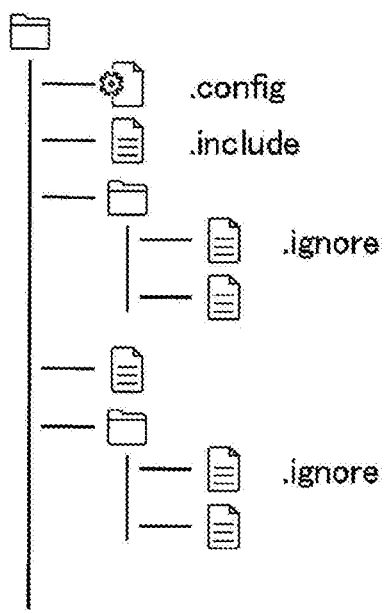
FIG. 9 is a diagram illustrating an example of the file tree in the host computer.

FIG. 9 illustrates an example of the file tree in the host computer 2. In FIG. 9, a definition file (include file) whose extension is "include" describes a list of the game files to be transferred to the game machine for development 10. In contrast, a definition file (ignore file) whose extension is "ignore" describes a list of the game files not to be transferred to the game machine for development 10. When the file requested by the game machine for development 10 to be transmitted is included in the include file, the host computer 2 determines that the file is allowed to be transmitted to the game machine for development 10. In contrast, when the file requested to be transmitted is included in the ignore file, the host computer 2 determines that the file is not allowed to be transmitted to the game machine for development 10. Both the include file and the ignore file may be used for determination as to whether or not the file is allowed to be transmitted, while only one of include file or the ignore file may be used.

What is claimed is:

1. A game machine for development that is connected to a host computer and to a storage device not connected to the host computer, and configured to read out a file requested by a game program under development, and execute the game program, the game machine for development comprising:
   a file confirmation section that is configured to confirm whether or not the file requested by the game program is stored in the storage device;
   a file request section that is configured to request the host computer to transmit the file to the game machine in a case where the file is not stored in the storage device; and
   a storage processor that is configured to acquire the file from the host computer and stores the file in the storage device; wherein
   synchronization is not established between the storage device and the host computer;
   a plurality of game developer computers are connected to the host computer, and each game developer computer uploads a respective game file to the host computer;
   a file tree of the host computer has an include definition file describing a list of files to be transferred to the game machine that includes at least one uploaded game file, and an ignore definition file describing a list of files not to be transferred to the game machine that includes at least one other uploaded game file;
   when the file requested by the game machine is included in the include definition file, the host computer determines that the file is allowed to be transmitted to the game machine;
   when the file requested by the game machine is included in the ignore definition file, the host computer determines that the file is not allowed to be transmitted to the game machine; and
   both definition files may be used for determination as to whether or not the file is allowed to be transmitted to the game machine, while only one of the definition files may be used.

2. The game machine for development according to claim 1, further comprising an update management section that acquires update information indicating that the file stored in the storage device is updated in the host computer.

3. The game machine for development according to claim 2, wherein in a case where the update management section retains the update information of the file requested by the game program, the file request section requests the host computer to transmit the file.

4. The game machine for development according to claim 2, wherein when a predetermined condition is satisfied, the file request section requests the host computer to transmit a file identified by the update information retained by the update management section.

5. The game machine for development according to claim 3, wherein the storage processor stores an updated file in the storage device together with a pre-update file.

6. The game machine for development according to claim 5, wherein the game program is capable of using the pre-update file, and the storage processor deletes the pre-update file from the storage device in a case where the game program is terminated.

7. A program execution method that executes a game program under development in a game machine for development connected to a host computer and to a storage device not connected to the host computer, the program execution method comprising:
confirming whether or not a file requested by the game program is stored in the storage device;
requesting the host computer to transmit the file to the game machine in a case where the file is not stored in the storage device; and
acquiring the file from the host computer and storing the file in the storage device; wherein
synchronization is not established between the storage device and the host computer;
a plurality of game developer computers are connected to the host computer, and each game developer computer uploads a respective game file to the host computer;
a file tree of the host computer has an include definition file describing a list of files to be transferred to the game machine that includes at least one uploaded game file, and an ignore definition file describing a list of files not to be transferred to the game machine that includes at least one other uploaded game file;
when the file requested by the game machine is included in the include definition file, the host computer determines that the file is allowed to be transmitted to the game machine;
when the file requested by the game machine is included in the ignore definition file, the host computer determines that the file is not allowed to be transmitted to the game machine; and
both definition files may be used for determination as to whether or not the file is allowed to be transmitted to the game machine, while only one of the definition files may be used.

8. A non-transitory, computer readable storage medium containing a computer program, which when executed by a computer in a game machine for development connected to a host computer and to a storage device not connected to the host computer, causes the computer to carry out actions, comprising:
confirming whether or not a file requested by a game program is stored in the storage device;
requesting the host computer to transmit the file to the game machine in a case where the file is not stored in the storage device; and
acquiring the file from the host computer and storing the file in the storage device; wherein
synchronization is not established between the storage device and the host computer;
a plurality of game developer computers are connected to the host computer, and each game developer computer uploads a respective game file to the host computer;
a file tree of the host computer has an include definition file describing a list of files to be transferred to the game machine that includes at least one uploaded game file, and an ignore definition file describing a list of files not to be transferred to the game machine that includes at least one other uploaded game file;
when the file requested by the game machine is included in the include definition file, the host computer determines that the file is allowed to be transmitted to the game machine;
when the file requested by the game machine is included in the ignore definition file, the host computer determines that the file is not allowed to be transmitted to the game machine; and
both definition files may be used for determination as to whether or not the file is allowed to be transmitted to the game machine, while only one of the definition files may be used.

* * * * *